(12) United States Patent
Kashikar

(10) Patent No.: US 6,818,698 B1
(45) Date of Patent: Nov. 16, 2004

(54) AQUEOUS EMULSIFICATION OF HIGH MOLECULAR WEIGHT FUNCTIONLIZED POLYOLEFINS

(75) Inventor: Sanjay Kashikar, Kelmis (BE)

(73) Assignee: Owens Corning Composites SPRL, Brussels (BE)

(*) Notice: Subject to any disclaimer, the term of this patent is extended or adjusted under 35 U.S.C. 154(b) by 10 days.

(21) Appl. No.: 10/334,468

(22) Filed: Dec. 31, 2002

Related U.S. Application Data

(60) Provisional application No. 60/416,687, filed on Oct. 7, 2002.

(51) Int. Cl.[7] .............................. C08J 3/05; C08L 23/00
(52) U.S. Cl. ........................ 524/836; 524/247; 524/251; 524/322; 524/816
(58) Field of Search ................................ 524/247, 251, 524/322, 819, 836

(56) References Cited

U.S. PATENT DOCUMENTS

| | | |
|---|---|---|
| 3,655,355 A | 4/1972 | Tissier |
| 3,912,673 A | 10/1975 | Force |
| 4,240,944 A | 12/1980 | Temple |
| 5,242,969 A * | 9/1993 | Arpin et al. ................ 524/458 |
| 5,389,440 A | 2/1995 | Arpin et al. |
| 5,955,547 A | 9/1999 | Roberts et al. |
| 6,166,118 A * | 12/2000 | Hyche et al. ............... 524/315 |

FOREIGN PATENT DOCUMENTS

| | | |
|---|---|---|
| GB | 2326164 | 12/1998 |
| JP | 402296855 | 12/1990 |

* cited by examiner

Primary Examiner—Kelechi C. Egwim
(74) Attorney, Agent, or Firm—Inger H. Eckert; Maria C. Gasaway

(57) ABSTRACT

A one-step direct method of making a high molecular weight functionalized polyolefin aqueous emulsion is provided. In this one-step direct method, a functionalized polyolefin having a molecular weight of at least 10,000, a fatty acid, a base, a surfactant, and water are heated in a pressure reaction vessel to a temperature above the emulsification temperature of the polyolefin with agitation for a period of time sufficient to form an aqueous emulsion. This high molecular weight functionalized polyolefin aqueous emulsion can be added to a sizing composition and applied directly onto glass fibers in the glass fiber manufacturing process.

8 Claims, 8 Drawing Sheets

AQUEOUS EMULSIFICATION OF HIGH MOLECULAR WEIGHT FUNCTIONLIZED POLYOLEFINS

CROSS REFERENCE TO RELATED APPLICATIONS

This non-provisional application claims priority under 35 U.S.C. §120 to U.S. Ser. No. 60/416,687, filed Oct. 7, 2002, the contents of which are incorporated in its entirety.

TECHNICAL FIELD AND INDUSTRIAL APPLICABILITY OF THE INVENTION

The present invention relates generally to the aqueous emulsification of high molecular weight polyolefins using a direct pressure process. In particular, the present invention relates to the aqueous emulsification of functionalized or chemically modified polyolefins that have a molecular weight greater than 10,000 in a one-step direct pressure process. The present invention also relates to the direct application of these high molecular weight functionalized polyolefin emulsions onto glass fibers, either during the glass fiber manufacturing process or at a later stage, to obtain reinforced polypropylene composites with a high mechanical performance.

BACKGROUND OF THE INVENTION

It is known in the art that glass fiber reinforced polymer composites possess higher mechanical properties compared to unreinforced polymer composites, provided that the reinforcement fiber surface is suitably modified by size chemical formulation. Thus, better dimensional stability, tensile strength and modulus, flexural strength and modulus, and impact resistance and creep resistance can be achieved with glass fiber reinforced composites.

Glass fiber reinforced polypropylene (PP) composites have widespread applications in various market sectors such as automotive, household, and other electrical appliances, that require a combination of specific short- and long term mechanical, physical, chemical, aging, and aesthetic properties. These properties play an important role in designing the final composite part. For example, stronger polypropylene composites permit the formation of parts with thinner walls, which helps to improve productivity with reduced cycle time, to reduce the weight of the part, to reduce the materials used to make the part, and to reduce the cost of the part. Improving the strength of composites also helps extend the life of the final part. In view of emerging application demands, the polypropylene composite industry is constantly looking for ways to develop stronger "next generation" polypropylene composites for new market applications and for replacements of other more expensive engineering plastics currently in use.

It is also known in the art that fiber-matrix interface interactions influence many bulk mechanical properties of reinforced composites. Thus, to effectively transfer the applied load from a weaker matrix resin to stronger fibers, it is necessary to improve fiber-matrix interactions, especially in glass fiber reinforced thermoplastic composites. Fiber surface treatment by applying chemical sizing formulations during glass fiber manufacturing to modify the fiber surface and improve fiber-matrix interactions, adhesion, and compatibility in composites has been practiced in the industry.

Various aqueous sizing formulations have been used in the glass fiber industry to maximize the fiber-matrix interactions for polypropylene composites. These sizing formulations include ingredients that collectively form an interphase between glass fibers and the matrix resin. Typically, the sizing formulation includes ingredients such as a film forming resin, a silane, a lubricant, an antistatic agent, and other chemical ingredients. Sizing formulations that include an aqueous emulsion of chemically modified or functionalized polyolefins, such as maleic anhydride grafted polypropylene, have been found to be beneficial.

The maleic anhydride grafted polypropylene ingredient included in most conventional sizing formulations in the form of an aqueous emulsion possesses a very low molecular weight (i.e., a molecular weight 6,000–9,000) and high grafting functionality levels (i.e., 5–10% by weight). The lower molecular weight (i.e., a molecular weight less than 10,000), the lower melt viscosities, and the higher maleic anhydride functionalization of these grafted polypropylenes have enabled their emulsification, such as by "indirect pressure" or "direct pressure" methods, without much difficulty. For example, a low molecular weight polyolefin is typically melted together and mixed with suitable emulsifying agents. An emulsion is then obtained by adding the necessary amount of water.

One example of a low molecular weight grafted polypropylene that is readily available is Epolene E43, a homopolypropylene grafted with maleic anhydride having a weight average molecular weight of approximately 9100. An aqueous emulsion from this grafted polypropylene has been useful in glass fiber sizing applications when it is a major ingredient. However, it is believed that because of the low molecular weight of the grafted polypropylenes, the composites reinforced with glass fibers sized with such low molecular weight grafted polypropylene formulations are not strong enough to meet current application needs. To enhance the lower end properties of such polypropylene composites, it has become common practice to add a high molecular weight functionalized polypropylene in solid form during the compounding stage of the manufacturing process. However, high quantities in solid form must be added to compensate for these lower end properties (e.g., between 2–15% by weight of the matrix resin must be added). Moreover, during the compounding stage, the added high molecular weight grafted polypropylene is dispersed throughout the composite part and is only partially directed towards the fiber surface, which results in a non-optimal use of this generally more expensive grafted solid polypropylene additive.

The aqueous emulsification of such high molecular weight grafted polypropylenes is difficult due to their higher molecular weight, higher melt viscosity, lower melt flow rate (MFR) or melt flow index (MFI), higher hydrophobicity, and relatively lower polarity. The emulsification of isotactic, high molecular weight grafted polypropylene becomes even more difficult due to their higher tendency to crystallize. Thus, it is extremely difficult to derive formulations to successfully achieve an aqueous emulsification of high molecular weight grafted polypropylene.

Various techniques have been disclosed to emulsify high molecular weight functionalized polyolefins. For example, French Patent No. 2,588,263 describes a technique for emulsifying isotactic polyolefins of high molecular weight by dissolving the polymer with heat in an organic solvent that is immiscible in water. Water is then added to dilute the mixture. This process requires the subsequent elimination of the solvent by extraction or by washing and drying. In addition to the burden of having additional steps, the use of organic hydrocarbon solvents creates safety concerns for the chemist emulsifying the polyolefins.

U.S. Pat. No. 4,240,944 describes the co-emulsification of a mixture of a high molecular weight isotactic grafted polypropylene together with a lower molecular weight amorphous grafted polypropylene in a ratio of 1:1 to 1:4 parts by weight along with the base and surfactant and subsequent addition of water to obtain an emulsion. However, in this method, not more than 50% of the isotactic high molecular weight grafted polypropylene can be incorporated into the emulsion. Further, it is believed that fairly large concentrations of lower molecular weight amorphous grafted polypropylene may ultimately be detrimental for composite properties at room temperature and, particularly, at elevated temperature applications.

U.S. Pat. Nos. 5,242,969 and 5,389,440 describe a two-step method of forming a high molecular weight polypropylene aqueous emulsion. In the first step, fluidization, melt mixing, and melt blending of a high molecular weight grafted polypropylene with a sufficient quantity of fatty acid is accomplished in an extruder at high shear and high temperature. The mixture is then cooled and ground. In the second step, the mixture is combined with a base and other ingredients in a pressure reactor. This method is disadvantageous in that it requires two steps, is expensive, and causes the polypropylene resin to experience two thermal cycles, which leads to excessive degradation and deterioration of the polypropylene structure. This degradation and deterioration of the polypropylene affects its mechanical properties and color performance in the composites formed.

U.S. Pat. No. 6,166,118 (and Great Britain Patent Application 232616A) describes an "indirect pressure" emulsification method, also called a "dilution method" or a "pressure dilution method". In this method, the ingredients are heated in a pressure vessel with agitation to form a pre-emulsion concentrate. Hot water (or steam) is then slowly added with pressure to the pressure reactor to dilute the contents. However, the addition of water leads to cooling of the reactor and the pre-emulsion concentrate must, therefore, be reheated and kept at that elevated temperature for time sufficient to form an emulsion. The mixture is then cooled to form an aqueous emulsion. This method is disadvantageous in that it requires extra equipment or a facility for hot water (or steam) handling, is time consuming due to the necessity of having to re-heat the contents of the pressure reactor after the water has been added, and is potentially dangerous due the fact that hot water (or steam) must be added with pressure during the course of the emulsification.

Therefore, it is desirable to provide an aqueous emulsification of high molecular grafted polypropylene coupling agents in a one-step direct pressure process to overcome the disadvantages of the prior art. It is also desirable to provide an efficient way of applying high molecular weight grafted polypropylenes onto glass fiber surfaces during the glass fiber manufacturing process.

SUMMARY OF THE INVENTION

Accordingly, an important object of the present invention is to provide a method of emulsifying high molecular weight functionalized polyolefins that overcomes the disadvantages of the prior art.

It is another object of the present invention to provide an aqueous emulsion of functionalized polyolefins that have a molecular weight greater than 10,000.

It is yet another object of the present invention to provide a one-step direct pressure process for the aqueous emulsification of high molecular weight functionalized polyolefins.

It is a further object of the present invention to provide stable, low discoloring, high molecular weight functionalized polypropylene emulsion formulations.

It is another object of the present invention to provide aqueous emulsions of high molecular weight functionalized polyolefins suitable for direct application to a glass fiber surface during the glass fiber manufacturing process.

It is another object of the present invention to deposit high molecular weight grafted polyolefin directly on the glass fiber surface during the glass fiber manufacturing process.

It is a feature of the present invention that the high molecular weight functional polyolefin emulsion is free of alkyl phenol based surfactants.

It yet another feature of the present invention that the high molecular weight functionalized polyolefin emulsion is free of solvents and volatile organic compounds.

It is an advantage of the present invention that the high molecular weight functionalized polyolefin emulsion allows efficient direct interaction with the glass fiber surface.

It is a further advantage of the present invention that the high molecular weight emulsion is able to reduce oxidation and discoloration of the composite part.

It is an advantage of the present invention that the high molecular weight functional polyolefin emulsion is environmentally friendly.

It is yet another advantage of the present invention that little or no quantity of high molecular weight grafted polypropylene coupling agents in solid form is required during the subsequent compounding stage to obtain a high composite mechanical performance.

It is a further advantage of the present invention that less glass fibers are needed to achieve high performance in the composite product.

These and other objects, features, and advantages are accomplished according to the present invention by providing a one-step direct method of making a high molecular weight functionalized polyolefin aqueous emulsion. In this one-step direct method, a functionalized polyolefin having a molecular weight of at least 10,000, a fatty acid, a base, a surfactant, and water are heated in a pressure reaction vessel to a temperature above the emulsification temperature of the polyolefin with agitation for a period of time sufficient to form an aqueous emulsion. This high molecular weight polyolefin aqueous emulsion can be added to a sizing composition and added directly to glass fibers in the glass fiber manufacturing process.

The foregoing and other objects, features, and advantages of the invention will appear more fully hereinafter from a consideration of the detailed description that follows.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
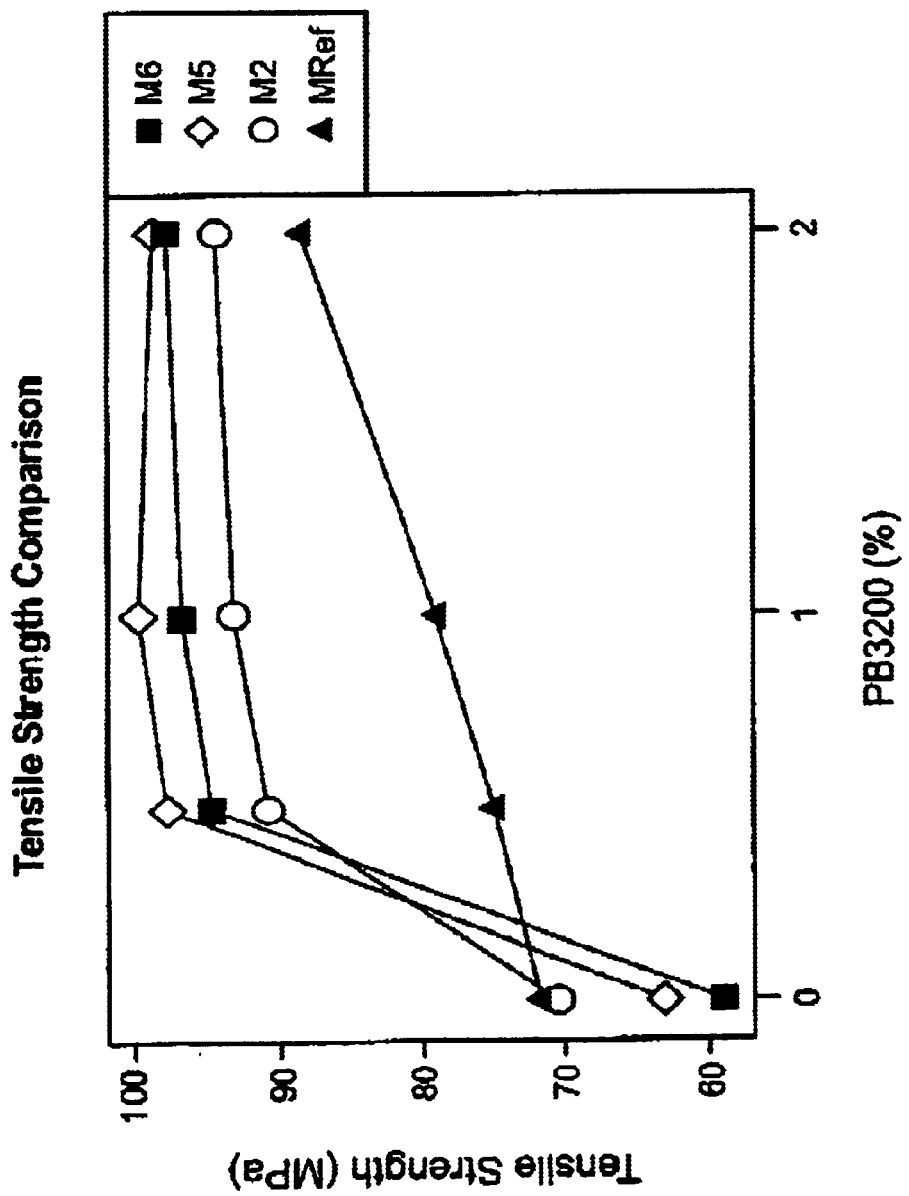
FIG. 1 is a graphical illustration of tensile strengths for composite parts based on high molecular weight aqueous emulsions according to the present invention and a reference sample.

The present invention solves the aforementioned disadvantages and problems of the prior art by providing an aqueous emulsification of high molecular weight functionalized polyolefins in a one-step direct pressure emulsification process that enables the application of these emulsions directly, efficiently, and evenly onto glass fibers during the sizing step in the manufacturing process. The term "grafted" and "functionalized" are used interchangeably herein. In addition, the term "polyolefin" and "polypropylene" are used interchangeably herein.

The emulsion components include a high molecular weight functionalized polyolefin, a surfactant or mixture of different surfactants, a fatty acid or mixture of different fatty acids, a base, and water. The functionalized polyolefins include polyethylene, polypropylene, polybutene, polyisobutylene, and polyhexene. Preferred polymers include homo- and copolymers of polyethylene that have a low, medium, or high density, as well as homo- and co-polymers of polypropylene that are crystalline, semi-crystalline, amorphous, or rubbery and elastomeric.

Functionalized or grafted polyolefins used in the emulsion include the above-described polyolefins that have reactive chemical functional groups attached to them. Suitable examples of the reactive groups include, but are not limited to, acids or anhydrides such as maleic acid, acrylic acid, methacrylic acid, maleic anhydride, acrylic anhydride, methacrylic anhydride, and oxiranes such as glycidyl acrylates or methacrylates. Suitable examples of high molecular weight maleic anhydride grafted polypropylenes available as coupling agents in solid form include, but are not limited to, Polybond PB3200, Polybond PB3000, Polybond PB4000, Fusabond M613-05, Fusabond MD353D, Fusabond 41 ID, Exxcelor PO1020, Priex 20099, Priex 21099, Epolene 3015, and Epolene 3003, and Orevac CA100. Functionalized polyolefin coupling agents are generally characterized by their type, molecular weight, melt flow index, degree of functionalization (given in weight percent), and acid number. Table 1 set forth below indicates varying types, degrees of functionalization, acid numbers, and molecular weights for different suitable high molecular weight grafted polypropylene coupling agents.

TABLE 1

Examples of Maleic Anhydride Grafted Polypropylene Coupling Agents

| Reference Names | Polymer Type | Mw range | Mn | MA % by wt | Acid No Mg KOH/g resin | Melt Flow Index g/10 min | Melting Point ° C. |
|---|---|---|---|---|---|---|---|
| PP1 | Homo | 84000–120000 | 33000 | 0.67–1.1 | 7.7–12.64 | 90–140 (190° C./2.16 kg) | 157 |
| PP2 | Homo | 61000–84000 | 24000 | 0.9–1.12 | 10.35–12.87 | 380–430 (190° C./2.16 kg) | 157 |
| PP3 | Homo | 61000–84000 | 24000 | 0.9–1.12 | 10.25–12.87 | 380–430 (190° C./2.16 kg) | 157 |
| PP4 | RandomCopo | 61400–71000 | 22900 | 1.3–1.7 | 14.94–19.54 | 450 (190° C./2.16 kg) | 136 |
| PP5 | RandomCopo | 73000 | 27900 | >1 | >11.49 | 290 (190° C./2.16 kg) | 136 |
| PP6 | ImpactCopo | 79000 | 19000 | 0.65–0.85 | 7.47–9.77 | 102 (190° C./2.16 kg) | 160 |
| PP7 | Homo | 93000 | 25000 | 0.55 | 6.32 | 120 (190° C./2.16 kg) | 162 |
| PP8 | RandomCopo | 60000 | 24000 | 0.5 | 5.75 | | 134 |
| PP9 | Homo | 60000 | 20000 | 0.26 | 3 | | 160 |
| PP10 | Homo | 60000 | 25000 | 0.64–0.8 | 7.36–9.2 | 80–170 (190° C./1.2 kg) | 160 |
| PP11 | Homo | 47000 | 24800 | 1.05–1.57 | 12–18.0 | | 155 |
| PP12 | Homo | 52000 | 27200 | 1–1.5 | 8 | | 156 |
| PP13 | Homo | 9100 | 3900 | 4–8.0 | 45 | | 155 |

PP1–PP12 = High mol wt maleic anhydride grafted Polypropylene coupling agents
PP13 = Low mol wt grafted Polypropylene shown as a reference in this table
Homo = Homopolymer based on propylene monomer
RandomCopo = Random copolymer of propylene and ethylene monomer
ImpactCopo = Impact copolymer or impact modifier based on Ethylene-Propylene rubber
Mw = Wt average mol wt
Mn = Number average mol wt
MA % = % by wt of Maleic Anhydride grafted on Polypropylene include polymers that are based on monomers of olefins having 2 to about 6 carbon atoms. Suitable examples of polymers based on these monomers, called polyolefins, Grafted polypropylene coupling agents having as low as a 0.5% maleic anhydride grafting level and having an acid number as low as 5.75 (e.g., PP8 in Table 1), and polypropylenes having a molecular weight as high as 120,000 (e.g., PP1 in Table 1) have been successfully emulsified using the one-step direct pressure process method described herein. However, the maleic anhydride grafting level is preferably greater than 0.5% and the molecular weight is preferably from about 100,000 to about 120,000. The high molecular weight grafted polypropylene coupling agents can be used alone or as a mixture of different coupling agents in the emulsification formulation. The amount of functionalized polyolefins in the emulsion is typically between 52–90% by weight of the total dry solids content, preferably between 60–80%, and more preferably between 65–75%.

A second component of the emulsion is saturated or unsaturated alkyl acids or fatty acids either in solid or liquid form having either a linear or branched structure. Suitable fatty acids include fatty compounds modified to contain acids, anhydrides, or esters. Saturated alkyl or fatty acids are preferred because they provide a better final color and are more stable to thermo-oxidation. Examples of suitable saturated fatty acids include stearic acid, palmitic acid, lauric acid, myristic acid, caprylic acid, and behenic acid, and fatty acids that contain 4–36, and preferably from 8–36, carbons. Typical examples of unsaturated fatty acids include oleic acid, tall oil fatty acid, palmitoleic, myristoleic, lauroleic, and linoleic acids. Fatty acids are advantageously used in lowering the melt viscosity of the high molecular weight polyolefin without degrading the polyolefin. In addition, the fatty acids act as lubricating agents during the size application process during glass fiber manufacturing. The fatty acids provide a structure that is similar to the polyolefins which improves the dispersion of the glass fibers in composites and provides compatibility between the fibers and the matrix resin during the cooling of the matrix resin. Because the fatty acids are capable of undergoing varying degrees of neutralization and are capable of producing varying HLB (Hydrophilic-Lypophilic Balance) values required for emulsification formulating systems, they can also be used as emulsifying agents. Therefore, the fatty acids are useful as emulsifiers for various emulsification systems alone or in combination with other emulsifying components. Typically, the quantity of fatty acid(s) present in the high molecular weight functionalized polypropylene emulsion is from 5–25%, more preferably from 10–20%, and even more preferably from 13–17% by weight of the of the total dry solids content.

A third component of the aqueous emulsion is a non-ionic emulsifier or surfactant or a mixture of non-ionic emulsifiers or surfactants. Although any non-ionic surfactant is suitable for use in the aqueous emulsion, ethoxylated aliphatic alkyl alcohols, ethoxylated fatty alcohols, ethoxylated aliphatic alkyl acids, ethoxylated fatty acids, or any combination thereof are desirably used. Suitable examples of such non-ionic emulsifiers include, but are not limited to, Pegosperse 1500 MS (HLB of 14) which is an ethoxylated fatty acid, Brij 78 (HLB 15.3) which is an ethoxylated fatty alcohol, Brij 35 (HLB 16.9), Lutensol ON60 (HLB 12.5) which is an ethoxylated alkyl alcohol.

The number of carbon atoms in the alky- or fatty chain can vary between 4 and 36 and the length of the ethoxylation in these compounds may range from 2–50 ethoxy units, but is desirably in the range of 3–35 ethoxy units. The number of carbon atoms in the alkyl group chain is generally between 4–36 carbons. Other surfactant types such as non-ionic surfactants and surfactants based on alkylphenols or ethoxylated nonylphenol compounds are not preferred for use in the aqueous emulsion because they are not environmentally friendly and are thermally less stable, which can cause yellowing in the composite part. The amount of surfactant or mixture of surfactants present in the aqueous emulsion ranges from 5–20%, preferably from 8–15% and more preferably 10–13% by weight of the total dry solid content.

Mixtures of emulsifiers having different HLB values have been used to produce an HLB value that is suitable for emulsification. The surfactants or emulsifiers in the aqueous emulsion provide long-term storage stability and are used to ensure good emulsion quality with fine particle size. Such emulsifiers also retain the color of the emulsion upon heating and do not produce discolored components.

A fourth component of the aqueous emulsion is a base. The base can be either organic, inorganic, or a combination of organic and inorganic bases. Although the base can be any known organic or inorganic base, suitable examples include hydroxides of the alkaline earth metals such as NaOH, KOH, and $Ca(OH)_2$, or organic amines, such as, but not limited to, 2-dimethylamino-1-ethanol (DMAE), 2-dimethylamino-1-propanol (DMAP), triethylamine (TEA), ammonia (NH3), 2-dimethylamino-2-methyl-1-propanol (DMAMP), and 2-amino-2-methyl-1-propanol (AMP). Preferably, the base is an organic amine or combination of amines, which is used to neutralize the carboxyl functions. The base is present in the aqueous emulsion in an amount sufficient to provide neutralization of the acid functions of the emulsion components. The base can be present in the aqueous emulsion from about 1–10% by weight, preferably from about 3–8% by weight, and even more preferably from 5–7% by weight of the total dry solid content.

A hydroxyl amine containing both amino and hydroxyl groups is the most desirable base due to qualities such as better handling, lower odor, lower volatility, and higher base strength. Such an amine permits lower quantities to be used to achieve a stable aqueous emulsion and provides improved stability to the aqueous emulsions. In addition, such an amine has the ability to neutralize higher molecular weight functionalized polyolefins (including functionalized polyolefins that have a lower acid functionality), to provide a solubilized system, and to facilitate the emulsification of the high molecular weight polyolefins. In addition, these amines can form water azeotrops so that excess amine can be easily removed from the aqueous system during drying. Moreover, the hydroxyl amine provides improved water resistance to the dried systems and does not cause undesirable color development in the dried parts.

Optionally, the aqueous emulsion can include one or more ingredients to improve the emulsion's physical characteristics (e.g., color and stability) and the coating performance. Such ingredients include bisulfites, sulfites, phosphites, phosphonites, phosphinates, hypophosphites of either alkali metals, alkaline earth metals, or ammonia. Suitable examples include sodium metabisulfite, sodium sulfite, and sodium hypophosphite, which can be used to improve the stability and color of the emulsion. The aqueous emulsion may also include antioxidants based on hindered phenols, diarylamines, thioethers, or metal deactivator/antioxidants to protect the composite product from degradation, which can ultimately result in better color. Color enhancers such as zinc sulfide or a zinc sulfide pigment may also be used in small quantities. Fluorescent ingredients, also known as optical brighteners, may also be included during the emulsification phase to improve the color of the emulsion and the final coating resulting from the emulsion. Other oligomeric or polymeric ingredients (e.g. oxidized polyethylene, low molecular weight polyamides, and poly(maleic anhydride-alt-1-octadecene)) with molecular weights ranging from 30,000–500,000 may be included to improve other characteristics such as adhesion and surface tension. The optional ingredients can range from 0.01 to 20% of the total dry content of the emulsion. The optional components may be used as alone or in combination with each other.

By including the optional ingredients during the emulsification phase, they can be dispersed in the aqueous emulsion and avoid any need to include these optional ingredients during size chemical mixing, which is generally done at milder mixing conditions which can lead to the settling of these ingredients. Such settling can cause breaks in the glass fiber manufacturing or can result in a poor coating onto the glass fiber. In addition, because these ingredients are dispersed in the aqueous emulsion when the emulsion is coated as sizing onto fiber surface, they can protect the coating from degradation and discoloration.

To form a high molecular weight functionalized polyolefin aqueous emulsion, all of the components of the aqueous emulsion (e.g., a high molecular weight functionalized polyolefin, a surfactant or mixture of different surfactants, a fatty acid or mixture of different fatty acids, a base, and water) are added to a pressure reaction vessel capable of performing at high temperature and high pressure conditions. Any well-known conventional pressure vessel is suitable for use in the emulsification of the high molecular weight functionalized polyolefin. Typical pressures of the emulsification range from 6–11 bars, but depend on the particular polyolefin being used, the total dry content of the emulsion, and the volume in the pressure vessel. Examples of emulsion formulations and emulsification results are set forth in Tables 2–2C below.

TABLE 2

| | Emulsification Formulations | | | | | | | |
|---|---|---|---|---|---|---|---|---|
| | E1 | E2 | E3 | E4 | E5 | E6 | E7 | E8 |
| Emulsion ingredients | | | | | | | | |
| PP1 | 13.28 | 13.10 | 13.17 | 13.17 | 13.27 | 13.27 | 13.63 | 13.38 |
| PP2 | | | | | | | | |
| PP3 | | | | | | | | |
| PP4 | | | | | | | | |
| PP5 | | | | | | | | |
| PP6 | | | | | | | | |
| PP7 | | | | | | | | |
| PP8 | | | | | | | | |
| PP9 | | | | | | | | |
| PP10 | | | | | | | | |
| PP11 | | | | | | | | |
| PP12 | | | | | | | | |
| Stearic acid | 3.72 | 4.58 | 3.69 | 3.69 | 3.19 | 3.19 | 1.36 | 1.34 |
| Peg 1500 MS | 1.59 | 1.57 | 1.58 | | 1.59 | | | |
| Brij 78 | | | | 1.58 | | 1.59 | 1.64 | 3.01 |
| Brij 72 | | | | | | | | |
| Brij 35 | | | 0.79 | 0.79 | 0.80 | 0.80 | 0.82 | 1.27 |
| DMAMP-80 | 1.63 | 2.03 | 1.61 | 1.61 | 1.39 | 1.39 | 0.61 | 0.60 |
| AMP-95 | | | | | | | | |
| NaMBS (Na2S2O5) | 0.13 | 0.13 | 0.13 | 0.13 | 0.13 | 0.13 | 0.14 | 0.13 |
| PA-18 | | | | | | | | |
| ZnS | | | | | | | | |
| Water | 79.65 | 78.59 | 79.03 | 79.03 | 79.63 | 79.63 | 81.80 | 80.27 |
| Total | 100.00 | 100.00 | 100.00 | 100.00 | 100.00 | 100.00 | 100.00 | 100.00 |
| Actual Solids content % | 19.10 | 20.20 | 19.90 | 20.00 | 19.40 | 19.30 | * | * |
| Quality | G | G | VG | VG | VG | VG | NG | NG |
| Stability | Stable | Stable | Stable | Stable | Stable | Stable | * | * |

Remarks
1) All ingredients are given in parts per 100 parts of total formulation.
2) NG = Not Good (either no emulsion formed or poor emulsification yield)
3) G = Good (particle size < 1μ)
4) VG = Very Good (particle size < 200 nm)
5) PP1–PP12 = high mol wt grafted polypropylenes (see Table 1)
6) NaMBS = Sodium metabisifit
7) DMAMP-80 = 80% solution of 2-dimethylaminomethyl-1-propanol (from Angus Chemie)
8) AMP-95 = 95% solution of 2-amino-2-methyl-1-propanol (from Angus Chemie)
9) Peg 1500 MS = POE-(15)-stearic acid (HLB = 14) (from Lonza Group)
10) Brij 78 = POE-(20)-stearyl alcohol (HLB = 15.3) (from Uniqema, ICI)
11) Brij 72 = POE-(2)-stearyl alcohol (HLB = 49) (from Uniqema, ICI)
12) Brij 35 = POE-(23)-lauryl alcohol (HLB = 16.9) (from Uniqema, ICI)
13) Stearic acid = Radiacid 152 (95% pure stearic acid) (from Fina Chemical)
14) PA-18 = Poly(maleic anhydride-ah-1-octadecene)
15) Zns = Zinc Sulphide (from Sachleben Chemie)
16) E = emulsion
* Remarks are applicable to Tables 2–2C

TABLE 2A (continuation of Table 2)

| | E9 | E10 | E11 | E12 | E13 | E14 | E15 | E16 | E17 |
|---|---|---|---|---|---|---|---|---|---|
| Emulsion ingredients | | | | | | | | | |
| PP1 | 13.34 | 13.30 | 13.27 | 20.97 | 20.97 | 20.94 | | | |
| PP2 | | | | | | | | | 20.58 |
| PP3 | | | | | | | | | |
| PP4 | | | | | | | | | |
| PP5 | | | | | | | | | |
| PP6 | | | | | | | | | |
| PP7 | | | | | | | 13.27 | 13.27 | |
| PP8 | | | | | | | | | |
| PP9 | | | | | | | | | |
| PP10 | | | | | | | | | |
| PP11 | | | | | | | | | |
| PP12 | | | | | | | | | |
| Stearic acid | 2.00 | 2.66 | 3.19 | 5.03 | 5.03 | 5.02 | 3.72 | 3.19 | 5.76 |
| Peg 1500 MS | | | | | 2.52 | | | | 2.47 |
| Brij 78 | 2.40 | 2.00 | 1.59 | 2.52 | | 2.51 | 1.59 | 1.59 | |
| Brij 72 | | | | | | | | | |
| Brij 35 | 1.20 | 0.93 | 0.80 | 1.26 | 1.26 | 1.26 | | 0.80 | |
| DMAMP-80 | 0.87 | 1.16 | 1.39 | 2.20 | 2.20 | 2.20 | 1.63 | 1.39 | 2.67 |
| AMP-95 | | | | | | | | | |
| NaMBS (Na2S2O5) | 0.13 | 0.13 | 0.13 | 0.21 | 0.21 | 0.21 | 0.17 | 0.13 | 0.15 |
| PA-18 | | | | | | | | | |
| ZnS | | | | | | 0.17 | | | |
| Water | 80.05 | 79.81 | 79.63 | 67.81 | 67.81 | 67.69 | 79.63 | 79.63 | 68.36 |
| Total | 100.00 | 100.00 | 100.00 | 100.00 | 100.00 | 100.00 | 100.00 | 100.00 | 100.00 |
| Actual Solids content % | * | 19.20 | 19.60 | 30.00 | 30.10 | 30.10 | 19.30 | 19.40 | 29.90 |
| Quality | NG | G | G | VG | VG | VG | G | G | VG |
| Stability | * | Stable | Stable | Stable | Stable | Stable | Stable | Stable | Stable |

TABLE 2B (continuation of Table 2)

| | E18 | E19 | E20 | E21 | E22 | E23 | E24 | E25 | E26 | E27 |
|---|---|---|---|---|---|---|---|---|---|---|
| Emulsion ingredients | | | | | | | | | | |
| PP1 | | | | | | | | | | |
| PP2 | 20.97 | | | | | | | | | |
| PP3 | | 20.54 | 20.97 | | | | | | | |
| PP4 | | | | 21.06 | 20.70 | 20.95 | 20.84 | 20.97 | | |
| PP5 | | | | | | | | | | |
| PP6 | | | | | | | | | | |
| PP7 | | | | | | | | | | |
| PP8 | | | | | | | | | 20.97 | |
| PP9 | | | | | | | | | | |
| PP10 | | | | | | | | | | 20.97 |
| PP11 | | | | | | | | | | |
| PP12 | | | | | | | | | | |
| Stearic acid | 5.03 | 5.75 | 5.03 | 4.21 | 6.11 | 4.19 | 4.17 | 5.03 | 5.03 | 5.03 |
| Peg 1500 MS | 2.52 | 2.47 | 2.52 | | | | | 2.52 | 2.52 | 2.52 |
| Brij 78 | | | | 4.21 | 2.17 | 4.19 | 4.17 | | | |
| Brij 72 | | | | | | | | | | |
| Brij 35 | 1.26 | | 1.26 | | | | | 1.26 | 1.26 | 1.26 |
| DMAMP-80 | 2.20 | 2.67 | 2.20 | 1.90 | 2.54 | 1.89 | 1.88 | 2.20 | 2.20 | 2.20 |
| AMP-95 | | | | | | | | | | |
| NaMBS (Na2S2O5) | 0.21 | 0.15 | 0.21 | 0.16 | 0.16 | 0.16 | 0.16 | 0.21 | 0.21 | 0.21 |
| PA-18 | | | | | | 0.52 | 1.04 | | | |
| ZnS | | 0.15 | | | | | | | | |
| Water | 67.81 | 68.26 | 67.81 | 68.46 | 68.32 | 68.10 | 67.74 | 67.81 | 67.81 | 67.81 |
| Total | 100.00 | 100.00 | 100.00 | 100.00 | 100.00 | 100.00 | 100.00 | 100.00 | 100.00 | 100.00 |
| Actual Solids | 30.10 | 29.90 | 30.00 | 29.80 | 29.80 | 29.90 | 30.30 | 29.70 | 29.70 | 29.80 |

TABLE 2B-continued (continuation of Table 2)

| | E18 | E19 | E20 | E21 | E22 | E23 | E24 | E25 | E26 | E27 |
|---|---|---|---|---|---|---|---|---|---|---|
| content % | | | | | | | | | | |
| Quality | VC | VG | VG | VG | VG | VG | VG | VG | VG | VG |
| Stability | Stable | Stable | Stable | Stable | Stable | Stable | Stable | Stable | Stable | Stable |

TABLE 2C (continuation of Table 2)

| | E28 | E29 | E30 | E31 | E32 | E33 |
|---|---|---|---|---|---|---|
| Emulsion ingredients | | | | | | |
| PP1 | | | | | | |
| PP2 | | | | | | |
| PP3 | | | | 17.89 | | |
| PP4 | | | | | 21.00 | 21.36 |
| PP5 | 20.97 | 19.67 | | | | |
| PP6 | | | | 3.06 | | |
| PP7 | | | | | | |
| PP8 | | | | | | |
| PP9 | | | | | | |
| PP10 | | | | | | |
| PP11 | | | 20.97 | | | |
| PP12 | | | | | | |
| Stearic acid | 5.03 | 5.51 | 5.03 | 5.03 | 5.04 | |
| Peg 1500 MS | 2.52 | 2.36 | 2.52 | 2.52 | 2.52 | |
| Brij 78 | | | | | | 4.27 |
| Brij 72 | | | | | | 4.27 |
| Brij 35 | 1.26 | 1.18 | 1.26 | 1.26 | 1.26 | |
| DMAMP-80 | 2.20 | 2.41 | 2.20 | 2.21 | | 0.53 |
| AMP-95 | | | | | 2.07 | |
| NaMBS (Na2S2O5) | 0.21 | 0.20 | 0.21 | 0.21 | 0.21 | 0.16 |
| PA-18 | | | | | | |
| ZnS | | | | | | |
| Water | 67.81 | 68.68 | 67.81 | 67.83 | 67.90 | 69.41 |
| Total | 100.00 | 100.00 | 100.00 | 100.00 | 100.00 | 100.00 |
| Actual Solids content % | 29.80 | 29.70 | 30.00 | * | 29.60 | * |
| Quality | G | VG | VG | NG | VG | NG |
| Stability | Stable | Stable | Stable | * | Stable | * |

The components of the aqueous emulsion are then heated with agitation at high pressure to a temperature above the melting temperature of the high molecular weight functionalized polyolefin for a period of time sufficient to emulsify the high molecular weight polyolefin. Typically, the components are heated to a temperature 10–20° C. above the melting temperature of the high molecular weight functionalized polyolefin for approximately 30–60 minutes with stirring, e.g., such as with a propeller type of stirrer or an anchor type of stirrer, or a combination of stirrers, to produce an aqueous emulsion. The resultant emulsion is subsequently cooled. Optimally, the cooling rate is as slow as possible, and is preferred to be just below 1° C. per minute. Additional cooling can optionally be provided once the temperature of the emulsion has cooled to approximately 95° C. The solid content of the aqueous emulsion in the reactor is generally 10–45%, preferably from 15–40%, and most preferably from 25–35% by weight.

As a result of the one-step direct pressure method described herein, very stable aqueous emulsions are formed which have a fine particle size and a milky white appearance. Particle size analytical results for representative inventive emulsions are set forth in FIGS. 5A, 5B, 5C, and 5D. As seen in FIGS. 5A–5D, which represent the particle size analysis for inventive aqueous emulsions E25, E13, E20 and E18 as described in Tables 2A and 2B, fine particle size and good quality aqueous emulsions are formed with the particle size ranging from 0.081 μm to 0.2 μm in diameter.

Unlike the conventional emulsification methods described above, the inventive method is a one-step direct pressure process, e.g., all the components are placed together in the reaction vessel and heated. There is no dilution step necessary (as in an indirect process), it does not require any extra equipment for hot water (or steam) handling, and no extrusion or grinding is necessary.

Once the aqueous emulsion of the high molecular weight functionalized polyolefin has been formed, the aqueous emulsion can be used in numerous applications, such as a component in coatings for floors, cars, metals, paper, textiles, as a component for sizing fibers (inorganic, synthetic, organic, or natural), as lubricants in paper calendaring, and as coatings for fruits. In one application, the aqueous polyolefin emulsion is incorporated into the sizing formulation that is deposited directly onto the surface of the glass fibers during the manufacturing process. The aqueous emulsion can be deposited onto the glass fibers by any means known to one skilled in the art. Glass fibers deposited with a sizing including the high molecular weight functionalized polyolefin aqueous emulsion can then be used to reinforce polyolefin matrix resins in a wide variety of forms, such as continuous strands, chopped strands, fabrics, and mats made form continuous-, chopped-, woven-, or non-woven fibers.

By applying the emulsified polyolefin emulsion to the glass fiber during the sizing step, the high molecular weight functionalized polyolefin is placed directly, evenly, and efficiently on the glass fibers. Applying such a high molecular weight polyolefin emulsion directly on the glass fiber surface provides optimal use of the high molecular weight grafted polyolefin for compatibilizing and coupling the glass fiber and the matrix resin and results in improved mechanical properties. When the high molecular weight grafted polyolefin is deposited directly on the glass fibers, it participates in creating a strong interphase between the glass fibers and the resin matrix and provides better compatibility with the polypropylene matrix. Thus, the high molecular weight grafted polyolefin emulsion not only provides stronger protection to the glass fiber surface but also improves the adhesion and compatibility of the glass fiber (an inorganic material) to the polyolefin matrix resin (an organic material). Moreover, since the high molecular weight grafted polyolefin coupling agent, used conventionally in solid form during the compounding stage, is now deposited on the fibers prior to the compounding stage, there is little need of the addition of a very high molecular weight grafted polyolefin coupling agent in solid form during a subsequent compounding stage.

Having generally described this invention, a further understanding can be obtained by reference to certain specific examples illustrated below which are provided for purposes of illustration only and are not intended to be all inclusive or limiting unless otherwise specified.

EXAMPLE

Sizing compositions shown in Table 3 below were prepared and applied to glass fibers during the glass fiber manufacturing process. The wet fibers were subsequently chopped in-line and dried in an oven according to standard manufacturing conditions. The dried chopped strands were compounded with a matrix polymer resin in a standard twin-screw extruder. The extruded compound was then chopped in-line into pellets and then molded using a standard injection molding machine to produce the composite parts and the test pieces.

TABLE 3

Examplary Formulations and the Chopped Glass Fiber Strands Produced from Them

Exemplary Sizing Ingredients

| Sizing Formulation SRef* | Aque. Emulsion ERef* | Silane RRef* | Lubricant* RRef* | Antifoam* RRef* | Chopped Fibers FRef* |
|---|---|---|---|---|---|
| S1 | 82.64 | 17.24 | 0.00 | 0.12 | F1 |
| S2 | 66.65 | 16.19 | 17.07 | 0.11 | F2 |
| S3 | 67.35 | 16.36 | 16.17 | 0.11 | F3 |
| S4 | 63.50 | 15.42 | 20.97 | 0.11 | F4 |
| S5 | 74.85 | 17.54 | 7.49 | 0.13 | F5 |
| S6 | 74.85 | 17.54 | 7.49 | 0.13 | F6 |
| S7 | 71.16 | 21.60 | 7.12 | 0.12 | F7 |
| S8 | 71.16 | 21.60 | 7.12 | 0.12 | F8 |
| S9 | 55.64 | 16.93 | 27.33 | 0.10 | F9 |

Remarks
1) All values in % by wt base on total dry content
2) Silane = Gamma aminopropyltriethoxysilane
3) Lubricant* = Same lubricant is used for all the examples and is given as proprietary information
4) Antifoam* = Same Antifoaming agent is used for all the examples and is given as proprietary information
5) ERef* = Refenence aqueous emulsion based on low mol wt grafted Polypropylene (mol wt < 10000)
6) FRef* and F1–F9 = Dried, chopped fibers based on sizing SRef* and S1–S9 respectively
7) RRef* = Proprietary sizing mw ingredients
8) SRef* = Aqueous sizing based on ERef* aqueous emulsion
9) S1, S2, S3, S4 = Aqueous sizing based on E22, E25, E18, E20 aqueous emulsion of invention respectively
10) S5–S9 = Aqueous sizings based on E13 aqueous emulsions of invention
11) Chopped fibers F1–F6 and F9 have average diameter of 14$\mu$
12) Chopped fibers F7 has 17$\mu$ whereas F8 has diameter of 10$\mu$ In one example, 30 parts of chopped glass fibers (average 4 mm in length) which were dried after applying the sizing which included the high molecular weight functionalized polyolefin aqueous emulsion according to the present invention, were extrusion compounded using a ZSK30/2 type extruder from Werner & Pfleiderer with 70 parts of homopolymer polypropylene matrix resins having a melt flow index of 10–12 g/10 min (236° C./2.16 kg) and 1.2 g/10 min (236° C./2.16 kg). The extrusion compounding formulations were blended with different concentrations of high molecular weight grafted polypropylene coupling agent in solid form (e.g., PB3200 from Uniroyal Chemicals, Crompton, U.S.) as shown below in Table 4.

TABLE 4

Exemplary Extrusion Compounding Formulations

| Compounding Formulation | PB3200 | | | | |
|---|---|---|---|---|---|
| | 0% | 0.5% | 1% | 1.20% | 2% |
| CRef* | X | X | X | X | X |
| C1 | | | X | X | X |
| C2 | X | X | X | X | X |
| C3 | | | X | | |
| C4 | | | X | | |
| C5 | X | X | X | | X |
| C6 | X | X | X | | X |
| C7 | | | X | | X |
| C8 | | | X | X | |
| C9 | | | X | X | X |

Remarks
1) All formulations include 30 parts by wt of dried, chopped glass fibers based on total formulation
2) 70 parts by wt of total formulation comprises Polypropylene matrix resin, high mol wt grafted coupling agent PB3200 in solid form and anti-oxidant HP2215
3) PB3200 = High mol wt grafted Polypropylene coupling agent added in solid form, from Uniroyal Chemicals, Crompton, US, in & by wt based on polypropylene matrix resin
4) HP2215 = Antioxidant from Ciba Chemicals
5) All formulations include 1% by wt of antioxidant e.g. HP 2215 based on the Polypropylene matrix resin
6) All formulation containing 0, 0.5, 1 and 2% by wt of PB3200 use Polypropylene matrix resin with Melt Flow Rate of 10–12 g/10 min (236° C./2.16 kg).
7) All formulations containing 1.2% by wt of PB3200 use Polypropylene matrix resin with Melt Flow Rate of 1.2 g/10 min (236° C./2.16 kg).
8) CRef* = compounding formulation based on dried, chopped fiber "FRef"
9) C1–C9 = compounding formulation based on dried, chopped fibers "F1–F9" respectively.

The extruded pellets were then injection molded using standard injection molding techniques known to those of skill in the art on a Demag D80 machine (Demag Hamilton Plastics, Ltd.) to produce ISO molding pieces that were then subjected to mechanical testing. Tensile strength was measured using a universal testing machine from Zwick according to ISO method 527-4, and the results were reported in MPa. Impact testing was carried out using a testing machine from Zwick. Impact resistance, a measure of the degree of impact force that the composite can withstand, measured in $KJ/m^2$ was measured according to ISO Method 179/1D in un-notched specimens, and according to ISO Method 180 in notched specimens (which were notched at 2 mm). Charpy impact strength is also a measure of impact strength and was measured as resistance in $KJ/m^2$ . The results of the mechanical testing in given in Table 5.

TABLE 5

Tensile Strength Comparison

| | PB3200 (%) | MRef* (MPa) | M1 (MPa) | M2 (MPa) | M3 (MPa) | M4 (MPa) | M5 (MPa) | M6 (MPa) | M7 (MPa) | M8 (MPa) | M9 (MPa) |
|---|---|---|---|---|---|---|---|---|---|---|---|
| A | 0 | 71.4 | * | 70.4 | * | * | 63 | 58.7 | * | * | * |
| B | 0.5 | 74.7 | * | 91.06 | * | * | 97.9 | 95 | * | * | * |

TABLE 5-continued

Tensile Strength Comparison

| | PB3200 (%) | MRef* (MPa) | M1 (MPa) | M2 (MPa) | M3 (MPa) | M4 (MPa) | M5 (MPa) | M6 (MPa) | M7 (MPa) | M8 (MPa) | M9 (MPa) |
|---|---|---|---|---|---|---|---|---|---|---|---|
| C | 1 | 78.7 | 93.6 | 93.4 | 95.4 | 97.1 | 99.7 | 96.9 | 88.65 | 106 | 97.6 |
| D | 1.2 | 97.7 | 99.6 | 101.1 | * | * | * | * | * | 112.9 | 106.9 |
| E | 2 | 88.4 | 94.3 | 94.4 | * | * | 99 | 97.9 | 91.7 | * | 98.2 |

Remarks
1) PB3200 = Maleic Anhydride grafted high mol wt Polypropylene coupling agent added in solid form
2) MRef* = Molded test pieces based on CRef* compounding formulation
3) M1–M9 = Molding test pieces based on C1–C9 compounding formulations
4) A, B, C and E = Based on Polypropylene resin matrix of 10 g/10 min (236° C./2.16 kg)
5) D = Based on Polypropylene resin matrix or 1.2 g/10 min (236° C./2.16 kg)

Tensile strength results were then compared for samples having different concentrations of high molecular weight grafted polypropylene coupling agents in solid form during the compounding stage. From the results shown in Table 5, it is clear that the mechanical properties are enhanced significantly for composites that used reinforcement fibers sized with a coating that included an aqueous emulsion of a high molecular weight grafted polypropylene according to the present invention (samples M1–M9 in Table 5) as compared to the reference (sample MRef in Table 5) which used reinforcement glass fibers "FRef" coated with sizing "SRef"comprising aqueous emulsion "ERef" of much lower molecular weight grafted polypropylenes. Moreover, the samples according to the invention (e.g., M1–M9) reached a maximum level of mechanical strength at a much lower concentration of high molecular weight grafted polypropylene coupling agent added in solid form during the compounding stage, whereas the reference sample required about 2% or more of a high molecular weight grafted polypropylene coupling agent in solid form to be added during the compounding stage to achieve an acceptable level of mechanical strength. Generally, higher composite properties are obtained when the reinforcement fiber diameter is reduced (i.e., the length to diameter ratio, called "aspect ratio" is increased). Accordingly, lower diameter reinforcement fibers provided higher mechanical properties for the composite as can be seen by sample M8 (having a 10 μm diameter) compared to other higher diameter reinforcement fibers. However, as can be seen from the results in Table 5, a higher diameter sample (e.g., M7 having a 17 μm diameter) showed higher level of mechanical properties as compared the reference sample MRef (having a 14 μm diameter). Thus, this improvement in mechanical strength is attributed to the sizing composition that includes a high molecular weight grafted polypropylene aqueous emulsion.

Figure 2:
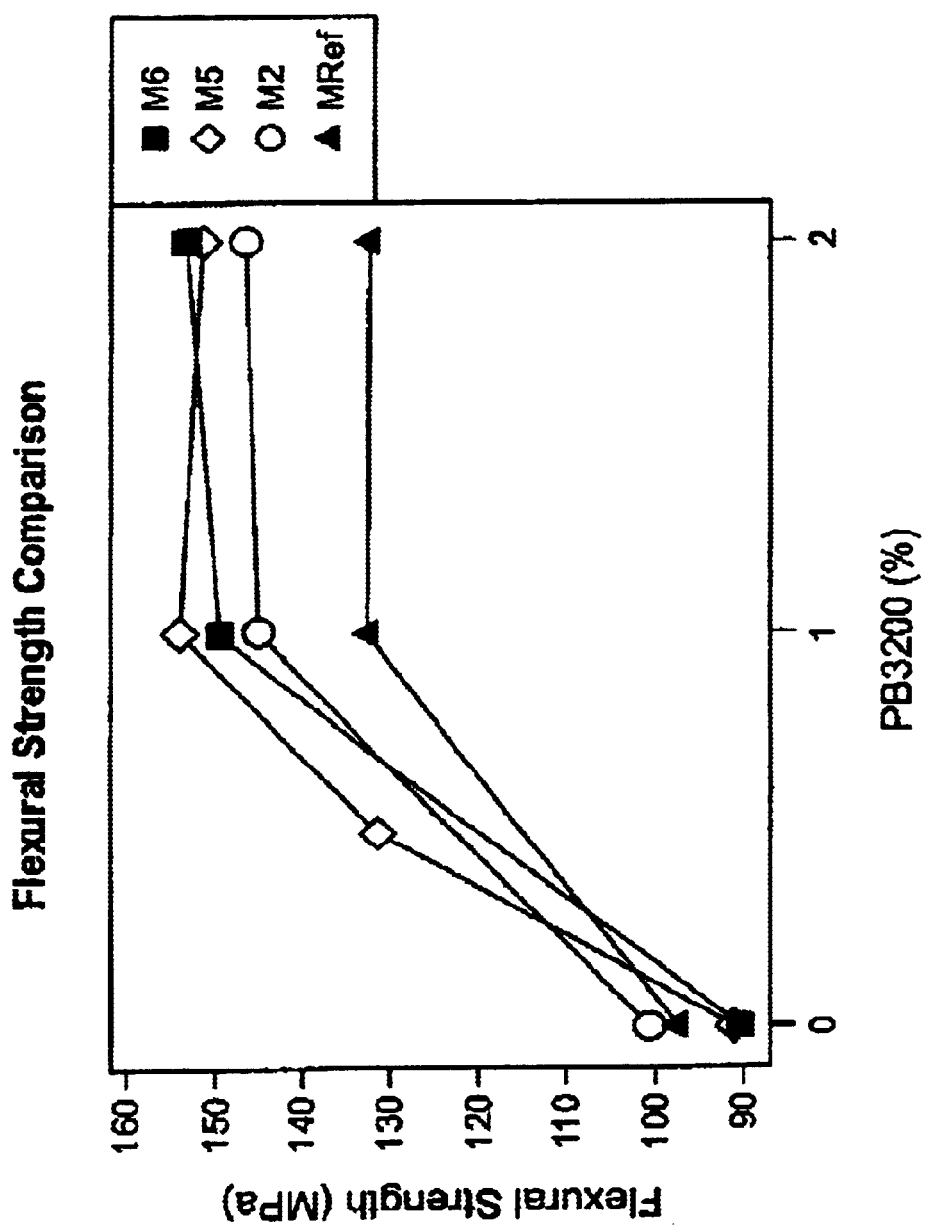
FIG. 2 is a graphical illustration of flexural strengths for composite parts based on high molecular weight aqueous emulsions according to the present invention and a reference sample.
Figure 3:
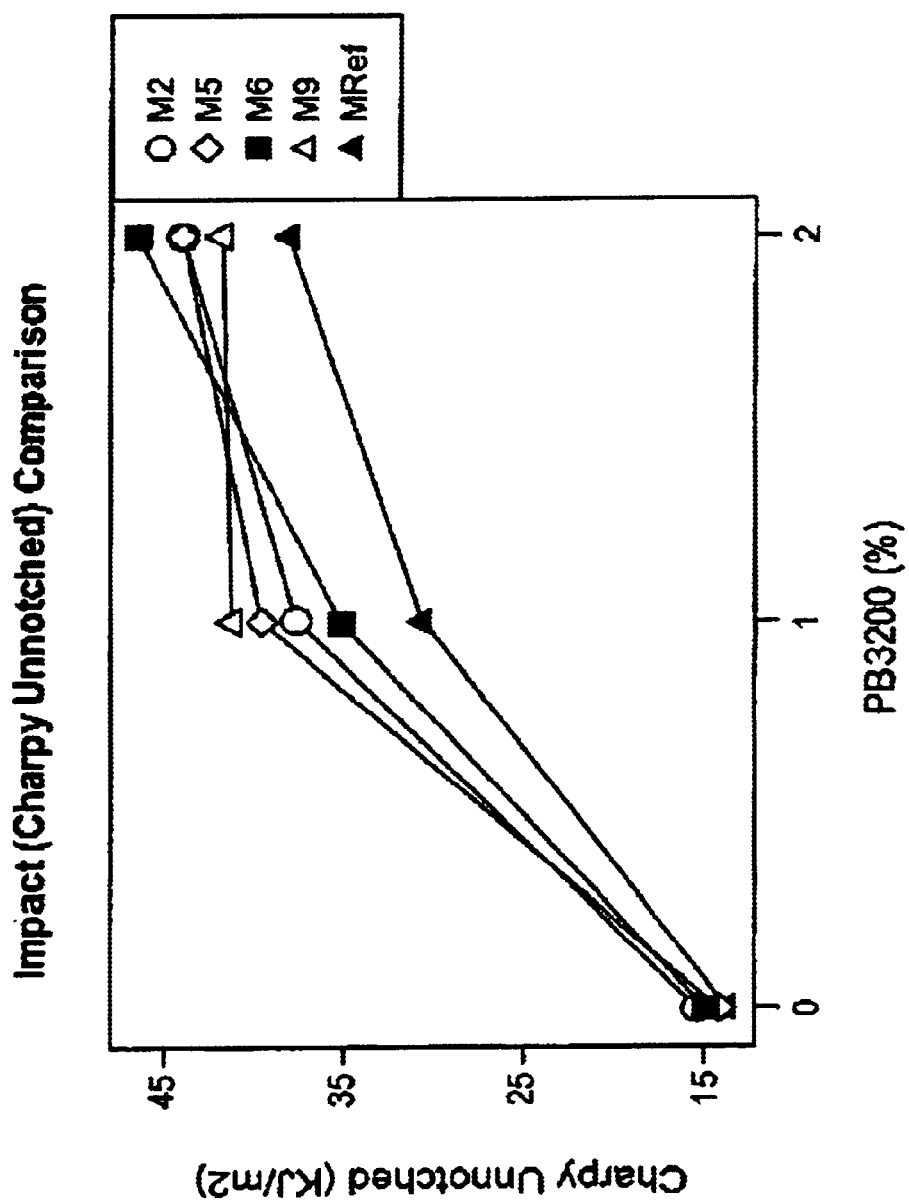
FIG. 3 is a graphical illustration of charpy unnotched impact strengths for composite parts based on high molecular weight aqueous emulsions and reference sample.
Figure 4:
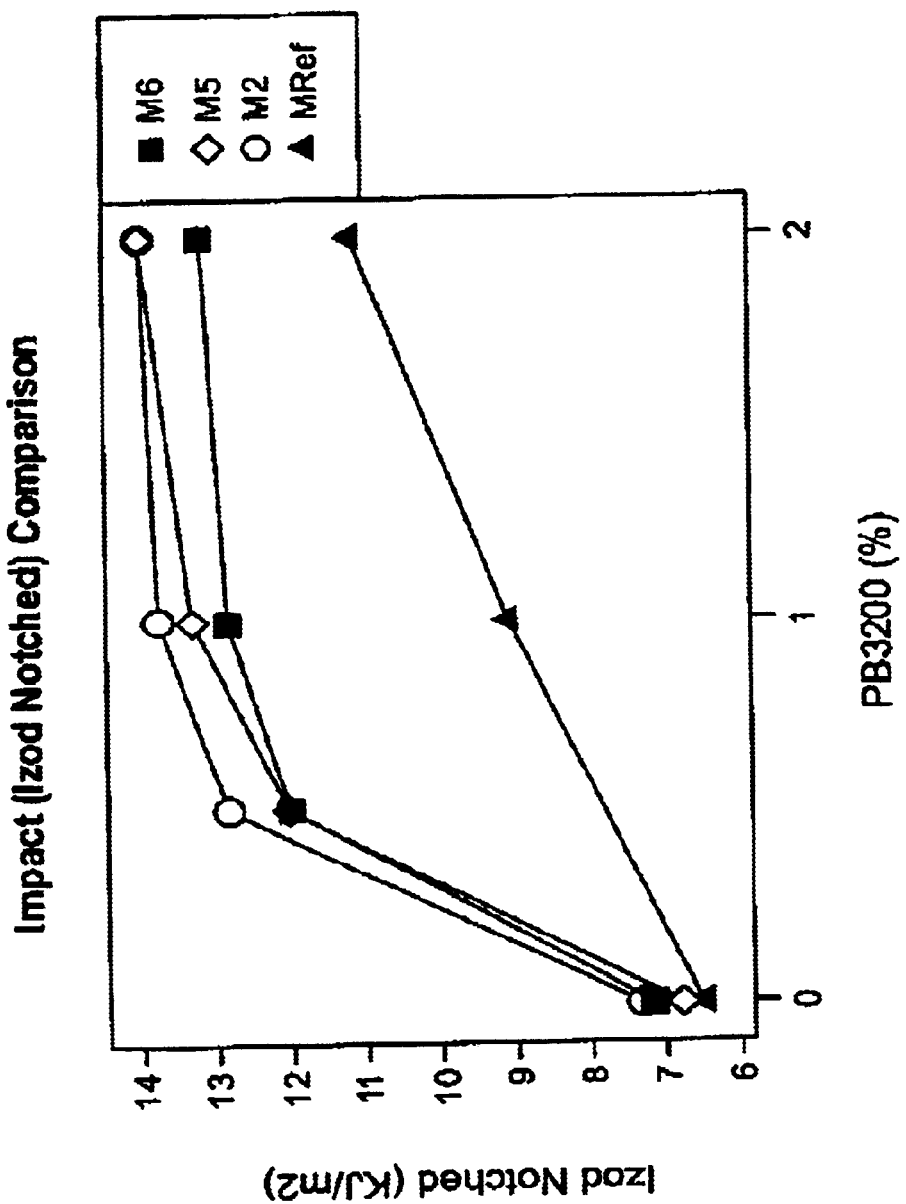
FIG. 4 is a graphical illustration of izod notched impact strength for composite parts based on high molecular weight aqueous emulsions according to the present invention and a reference sample.
Figure 5A:
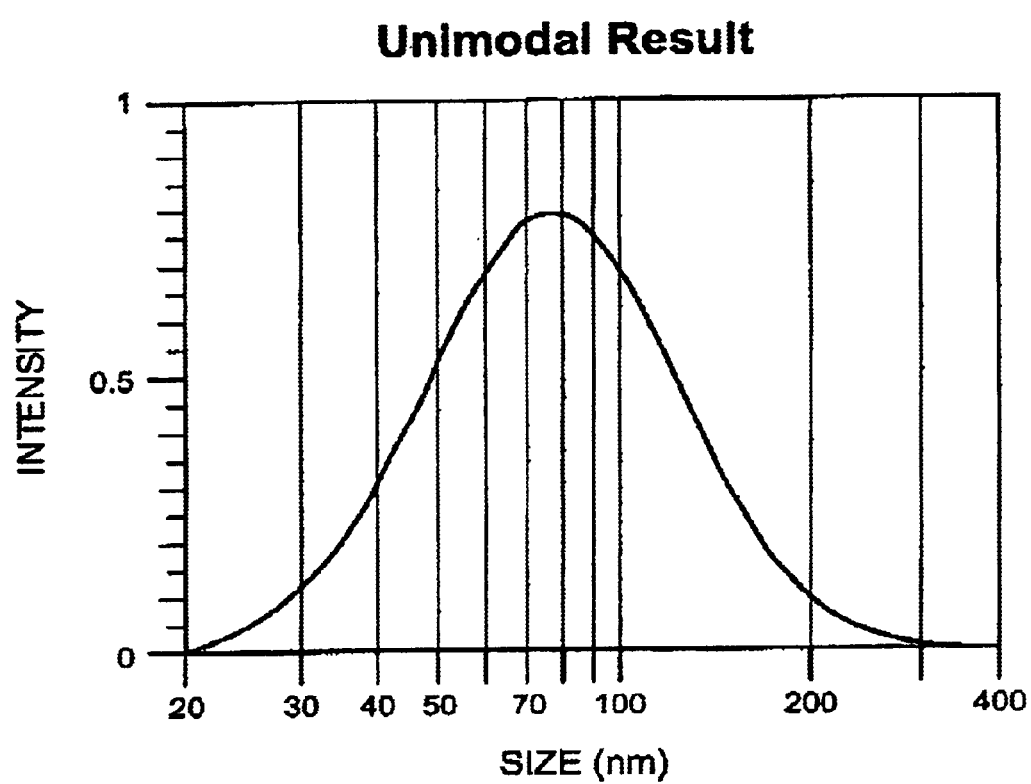
FIG. 5A is a graphical illustration of the mean particle size and particle distribution of emulsion sample E25 of Table 2.
Figure 5B:
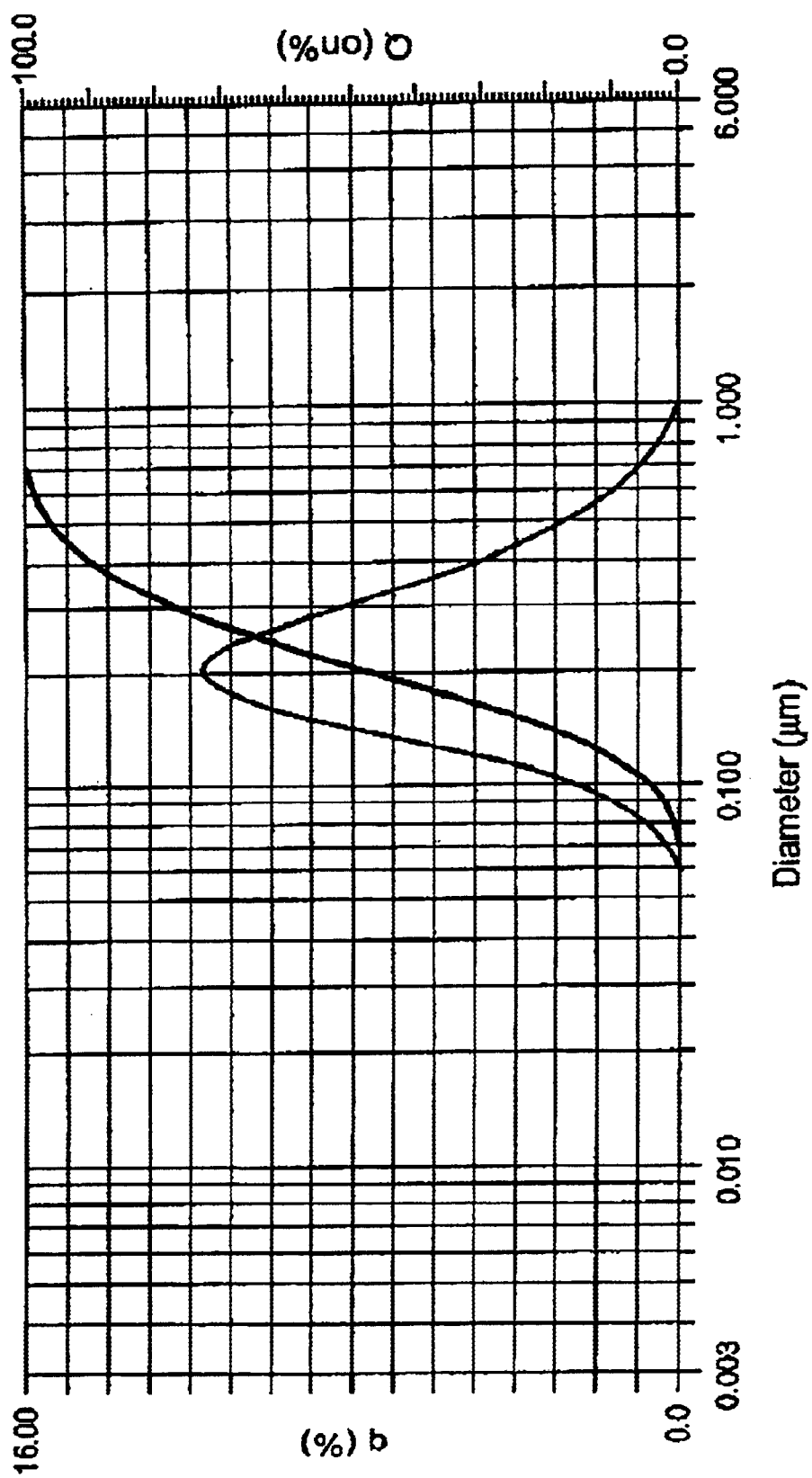
FIG. 5B is a graphical illustration of the mean particle size and particle distribution of emulsion sample E13 of Table 2.
Figure 5C:
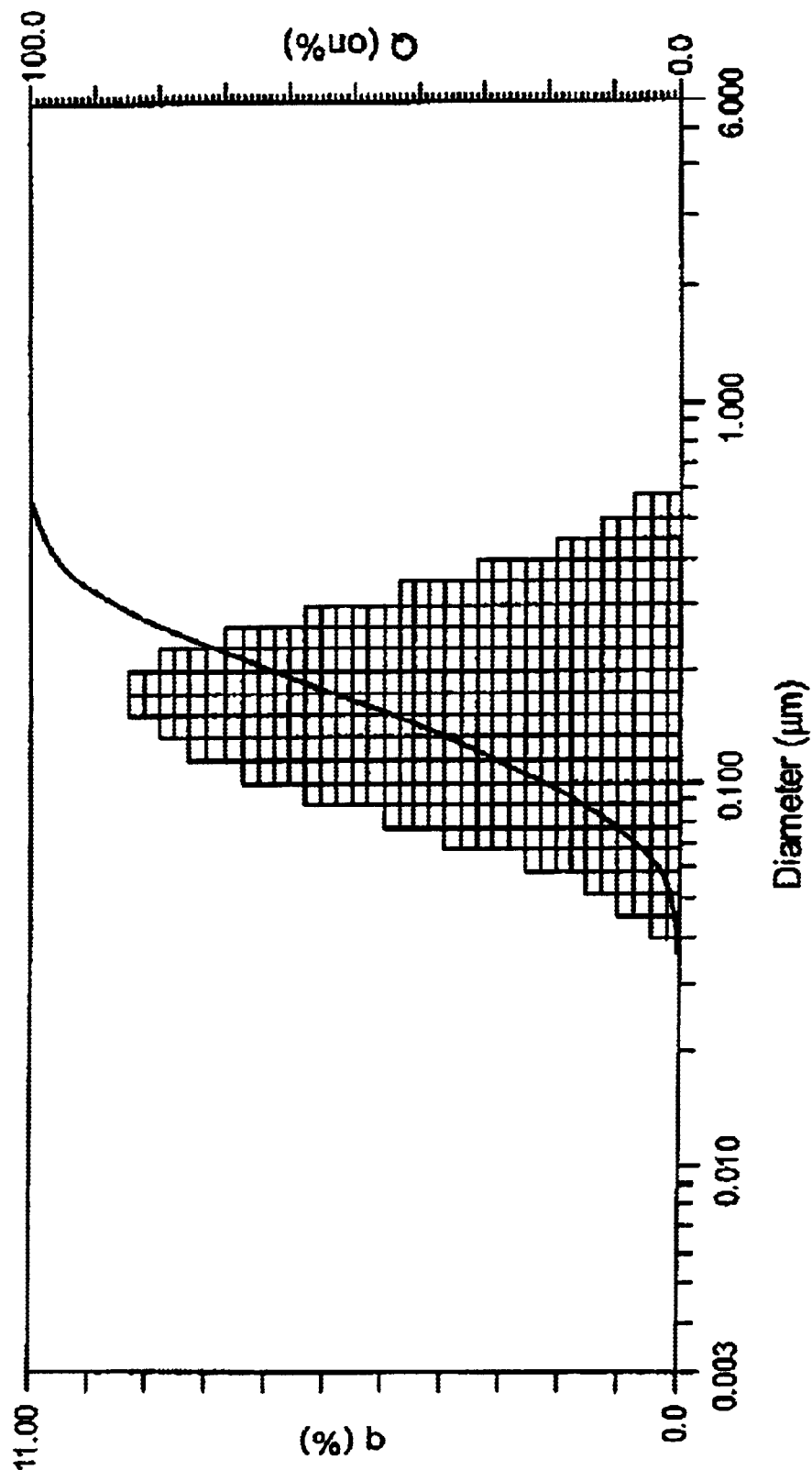
FIG. 5C is a graphical illustration of the mean particle size and particle distribution of emulsion sample E20 of Table 2.
Figure 5D:
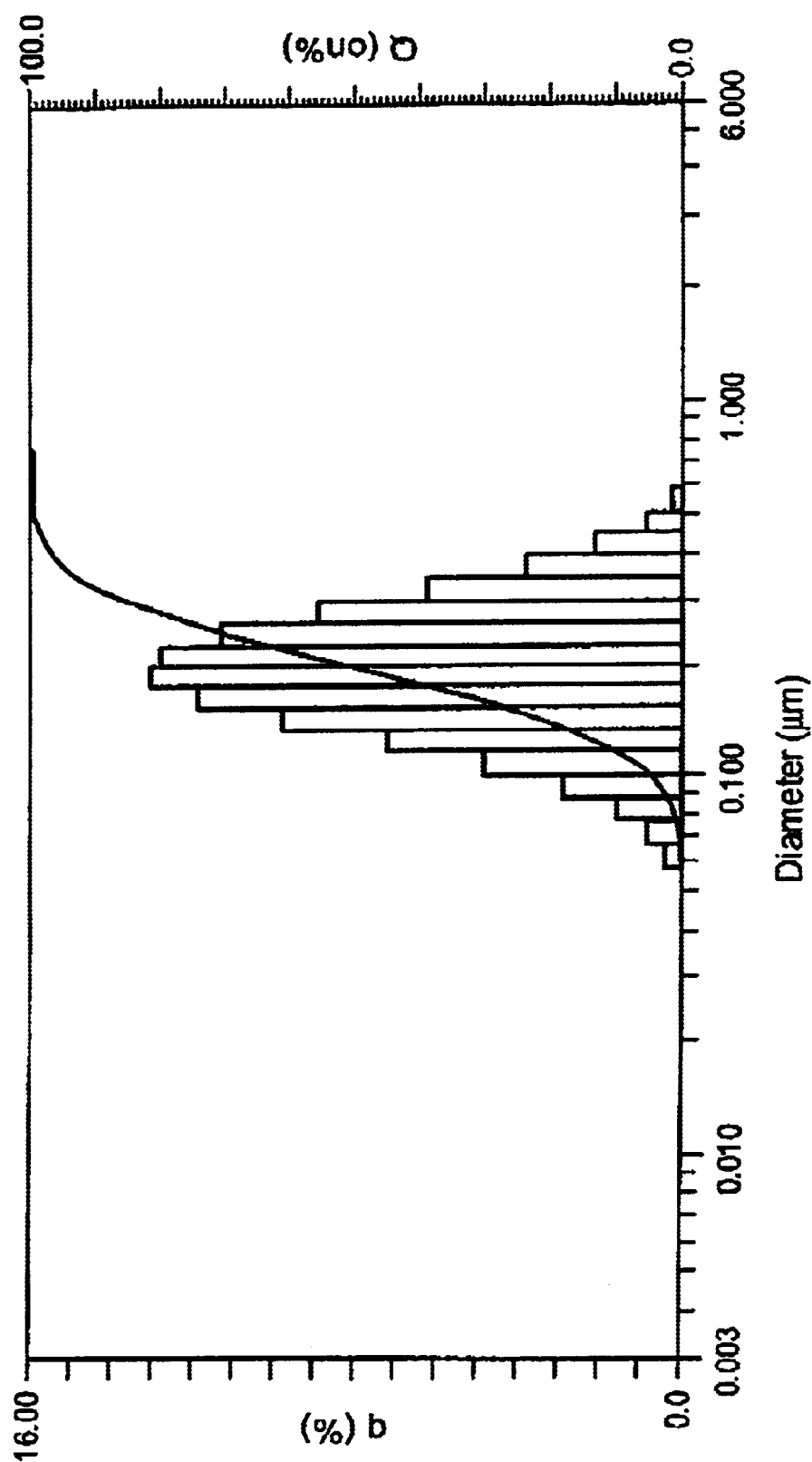
FIG. 5D is a graphical illustration of the mean particle size and particle distribution of emulsion sample E18 of Table 2.

Tensile strength results are also graphically represented in FIG. 1 for inventive samples such as M2, M5, and M6 compared to reference sample, MRef. Similarly, FIG. 2 illustrates a clear enhancement in flexural strength properties for inventive samples such as M2, M5, and M6 compared to reference sample, MRef. FIGS. 3 and 4 provide comparisons for Charpy Unnotched Impact resistance and Izod Notched Impact resistance respectively. From FIGS. 1–4, it can be seen that significant improvements in composite performance have been achieved by the use of aqueous emulsions of high molecular weight grafted polypropylenes according to the present invention. Also, because a higher mechanical performance is obtained at a lower level of addition of high molecular weight grafted polypropylene coupling agents in solid form during the compounding stage, optimal use is made of these coupling agents by first emulsifying the high molecular weight functionalized polypropylene in an aqueous phase and depositing it directly on the glass fibers during sizing in the glass fiber manufacturing process.

From the results illustrated in Tables 3–5 and in FIGS. 1–4, it is apparent that using the high molecular weight grafted polypropylene coupling agents in the form of aqueous emulsions provides an unexpected and superior improvement in composite mechanical properties at a reduced level of addition of the coupling agent during the compounding stage in chemically coupled polypropylene reinforcement by glass fibers.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

What is claimed is:

1. A one-step direct pressure method of forming an aqueous emulsion of a high molecular weight polyolefin consisting essentially of:
   heating a polyolefin having a molecular weight of at least 10,000, a surfactant, a fatty acid, a base, and water to a temperature above an emulsification temperature of said polyolefin in a pressure reaction vessel with agitation at high pressure for a time period sufficient to form an aqueous polyolefin emulsion.

2. The one-step method of claim 1, wherein said polyolefin has a molecular weight of about 100,000–120,000.

3. The one-step method of claim 2, wherein said polyolefin is a functionalized polyolefin including at least one reactive chemical functional group.

4. The one-step method of claim 3, wherein said reactive chemical functional group is selected from the group consisting of maleic acid, acrylic acid, methacrylic acid, maleic anhydride, acrylic anhydride, methacrylic anhydride, glycidyl acrylates and methacrylates.

5. The one-step method of claim 2 wherein said polyolefin is selected from the group consisting of polyethylene, polypropylene, polybutene, polyisobutylene and polyhexene.

6. The one-step method of claim 1, wherein said temperature is 10 to 20° C. above said emulsification temperature of said polyolefin.

7. The one-step method of claim 1, wherein said period of time is from 30 to 60 minutes.

8. The one-step method of claim 1, wherein a solid content of the aqueous emulsion in said pressure reaction vessel is from 10–45% by weight.

* * * * *